(12) United States Patent
Peters et al.

(10) Patent No.: US 10,797,950 B2
(45) Date of Patent: Oct. 6, 2020

(54) SYSTEMS AND METHODS FOR DYNAMICALLY CONFIGURING A NETWORK SWITCH FOR MONITORING

(71) Applicants: John A Peters, Roseville, MN (US); Robert L Bergerson, Roseville, MN (US); Jason C Schultz, Roseville, MN (US)

(72) Inventors: John A Peters, Roseville, MN (US); Robert L Bergerson, Roseville, MN (US); Jason C Schultz, Roseville, MN (US)

(73) Assignee: Unisys Corporation, Blue Bell, PA (US)

(*) Notice: Subject to any disclaimer, the term of this patent is extended or adjusted under 35 U.S.C. 154(b) by 216 days.

(21) Appl. No.: 14/985,498

(22) Filed: Dec. 31, 2015

(65) Prior Publication Data

US 2017/0195170 A1    Jul. 6, 2017

(51) Int. Cl.
*G06F 15/173* (2006.01)
*H04L 12/24* (2006.01)

(52) U.S. Cl.
CPC ...... *H04L 41/0843* (2013.01); *H04L 41/0853* (2013.01)

(58) Field of Classification Search
CPC ............ H04L 41/0843; H04L 41/0803; H04L 41/0086; H04L 69/14; H04L 12/44; H04L 12/46; H04L 41/0866; H04L 41/14; H04L 41/0893; H04L 41/0886
USPC ........................................ 709/223, 224, 217
See application file for complete search history.

(56) References Cited

U.S. PATENT DOCUMENTS

| | | | | |
|---|---|---|---|---|
| 7,290,043 B1* | 10/2007 | Kuditipudi | .......... | H04L 41/0213 709/220 |
| 8,041,786 B2* | 10/2011 | Tindal | ................. | H04L 41/0893 709/220 |
| 9,489,154 B1* | 11/2016 | Haapanen | ............. | G06F 3/1203 |
| 2005/0015485 A1* | 1/2005 | Keefer | ................ | G06F 11/3006 709/224 |
| 2005/0268152 A1* | 12/2005 | Yamaguchi | .......... | G06F 11/3409 714/4.1 |
| 2006/0159032 A1* | 7/2006 | Ukrainetz | ......... | H04L 29/12216 370/254 |
| 2007/0237141 A1* | 10/2007 | Marchese | ............... | H04L 41/12 370/389 |
| 2008/0052433 A1* | 2/2008 | Harima | ................. | G06F 3/0605 710/104 |
| 2009/0287913 A1* | 11/2009 | Woods | ................ | H04L 41/0806 713/1 |
| 2013/0157637 A1* | 6/2013 | Bos | ....................... | H04W 8/245 455/418 |

(Continued)

*Primary Examiner* — Kaylee J Huang

(57) ABSTRACT

Systems and methods for dynamically configuring a network switch for monitoring are disclosed. Embodiments may include receiving an IP address associated with a network switch. Embodiments may also include probing the network switch based, at least in part, on the received IP address to obtain first information regarding the network switch, wherein the first information includes at least one of a vendor of the network switch, a model of the network switch, and a firmware version of the network switch. Embodiments may further include configuring the processor to monitor the network switch based on processing of the first information.

15 Claims, 4 Drawing Sheets

(56) References Cited

U.S. PATENT DOCUMENTS

| | | | |
|---|---|---|---|
| 2014/0019608 A1* | 1/2014 | Kawakami | H04L 41/12 709/223 |
| 2015/0192913 A1* | 7/2015 | Vitek | G05B 9/02 700/275 |
| 2016/0156516 A1* | 6/2016 | Nishi | H04L 43/0829 370/329 |
| 2017/0034162 A1* | 2/2017 | Isola | H04L 63/0876 |

* cited by examiner

SYSTEMS AND METHODS FOR DYNAMICALLY CONFIGURING A NETWORK SWITCH FOR MONITORING

FIELD OF THE DISCLOSURE

The instant disclosure relates to computer networks. More specifically, this disclosure relates to the dynamic configuration of commodity network switches for health monitoring.

BACKGROUND

Monitoring the health of switches in an enterprise network can be a formidable task. For example, while configuring network management tools to monitor a single switch is fairly straightforward, the configuring of network management tools to potentially monitor dozens of switches in an enterprise network is not. In most enterprise networks, there will be switches from several different vendors deployed. Typically, switches with different switch models require different configuration files to set up the different switches for monitoring by a network management tool. Also, multiple switches of the same model may have different firmware versions installed, which can redefine the object identifiers (OIDs) for the same component being monitored. As a result, the same switch model may require different configuration files if different firmware models are installed on different switches of the same switch model.

Setting up numerous configuration files, however, can be time consuming, resulting in reduced network administrator efficiency. For example, a configuration file used to configure a network management tool to monitor a network switch typically must include specific properties of a switch. As noted above, different configurations are required for different variations of network switches, such as different switch vendors and different firmware levels. Thus, in order to create configuration files for each of the network switches to set up the network switches for monitoring, a network administrator must know all the properties of all the switches in the network. Obtaining the information for all the switches in the network is a time consuming task when the network is large, as is typical of most networks. The problem is exacerbated by the fact that vendors often update the firmware version used by some network switches, requiring a network administrator to obtain the configuration information again to create new configuration files for updated network switches. Accordingly, traditional configuration of a network management tool for the monitoring of network switches is less than optimal.

SUMMARY

The configuration of a network to allow network management tools to monitor switches in the network may be improved by removing the need for network administrators to have detailed knowledge of the properties of every switch in the network. Embodiments of this disclosure allow for the configuration of network management tools to monitor network switches based on knowledge of only the Internet Protocol (IP) addresses associated with the network switches. In particular, a computing system provided with the IP addresses of network switches may probe the switches for any information needed to configure a network management tool to monitor the switches. For example, the computing system may probe the network switches to obtain information regarding the vendor, model, and firmware version of the network switches. Based on that information, the computing system may select template files to use to create configuration files for a network management tool, allowing the network management tool to monitor the network switches.

In particular, a method for dynamically configuring a network switch for monitoring may include receiving, by a processor, an Internet Protocol (IP) address associated with a network switch. The method may also include probing, by the processor, the network switch based, at least in part, on the received IP address to obtain first information regarding the network switch, wherein the first information includes at least one of a vendor of the network switch, a model of the network switch, and a firmware version of the network switch. The method may further include configuring, by the processor, the processor to monitor the network switch based on processing of the first information.

According to another embodiment, a computer program product may include a non-transitory computer-readable medium comprising instructions which, when executed by a processor of a computing system, cause the processor to perform the step of receiving an Internet Protocol (IP) address associated with a network switch. The medium may also include instructions which, when executed by a processor of a computing system, cause the processor to perform the step of probing the network switch based, at least in part, on the received IP address to obtain first information regarding the network switch, wherein the first information includes at least one of a vendor of the network switch, a model of the network switch, and a firmware version of the network switch. The medium may further include instructions which, when executed by a processor of a computing system, cause the processor to perform the step of configuring the processor to monitor the network switch based on processing of the first information.

According to yet another embodiment, an apparatus may include a memory and a processor coupled to the memory. The processor may be configured to execute the step of receiving an Internet Protocol (IP) address associated with a network switch. The processor may also be configured to execute the step of probing the network switch based, at least in part, on the received IP address to obtain first information regarding the network switch, wherein the first information includes at least one of a vendor of the network switch, a model of the network switch, and a firmware version of the network switch. The processor may be further configured to execute the step of configuring the processor to monitor the network switch based on processing of the first information.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

A module, as disclosed herein, may be implemented in programmable hardware devices such as field programmable gate arrays, programmable array logic, programmable logic devices or the like. Modules may also include software-defined units or instructions, that when executed by a processing machine or device, transform data stored on a data storage device from a first state to a second state. An identified module of executable code may, for instance, comprise one or more physical or logical blocks of computer instructions that may be organized as an object, procedure, or function. Nevertheless, the executables of an identified module need not be physically located together, but may comprise disparate instructions stored in different locations that, when joined logically together, comprise the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Figure 1:
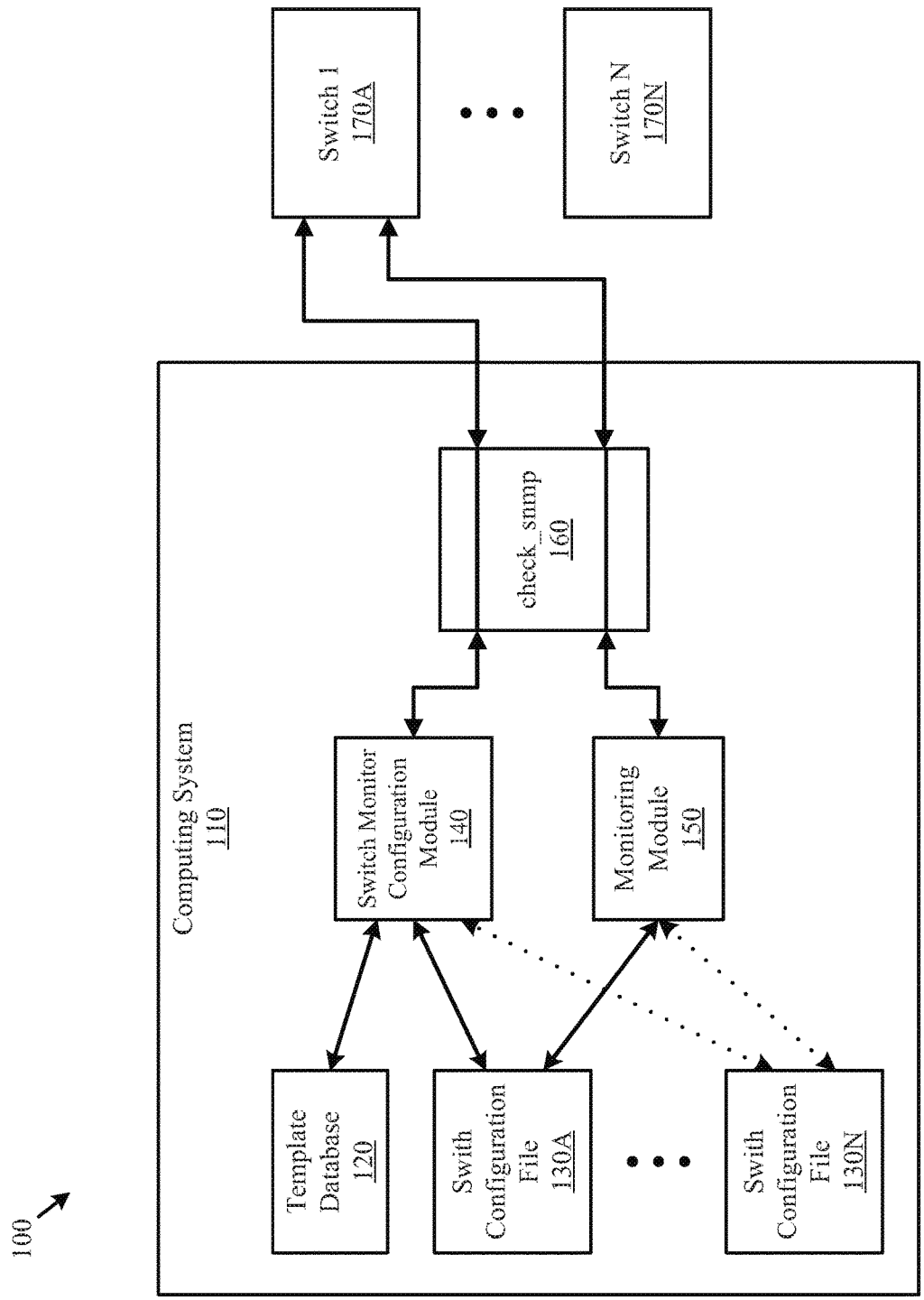
FIG. 1 is a block diagram illustrating a computer network system according to one embodiment of the present disclosure.

FIG. 1 is a block diagram illustrating a computer network system 100 according to one embodiment of the present disclosure. Network system 100 includes computing system 110 and network switches 170. Switches 170 may be switches from the same or different vendors, may be the same or different models of a switch, and may have the same or different firmware versions installed on them. As an example, switches 170 may include Netgear, Mellanox, or other similar switches.

Each switch 170 may include numerous objects (components) which can be monitored by a network management tool, such as monitoring module 150 of computing system 110. For example, objects which may be made available by a switch 170 for monitoring and management by a network management tool may include power supplies, fans, temperature sensors, switch ports, and the like. Thus, in some embodiments, monitoring may include at least verifying that fan RPMs and temperatures do not fall out of a specified range or verifying that a power supply is on. Information regarding the components of a switch 170 which can be monitored may be specified in Management Information Bases (MIBs) stored within the switch 170. In general, an object within a switch 170 which can be monitored and managed may be uniquely identified by an Object Identifier (OID), and a MIB may define a series of OIDs that can be read by a network management tool. For example, a network management tool utilizing a Simple Network Management Protocol (SNMP) may read the OIDs from an MIB using a SNMP Get Request. In some embodiments, similar switches that have different firmware levels/versions installed on them may define the same objects with different OIDs.

A MIB may be a standard MIB or a switch-specific (vendor-specific) MIB. A standard MIB may be available for monitoring in every switch 170 and may include standard switch information, such as the serial number, firmware version, port count, and the like. Thus, when a switch 170 receives a request for information in a standard MIB, the switch 170 is able to respond, regardless of its vendor, model, firmware, or other property of the switch. A switch-specific MIB may define OIDs for certain entities that are specific to a particular switch model and/or firmware level.

As illustrated in FIG. 1, computing system 110 includes a template database 120, switch configuration files 130, a switch configuration module 140, a monitoring module 150 (also referred to in this disclosure as a network management tool), and a check_snmp module 160. Computing system 110 may operate within one or more of a variety of operating systems, such as Linux, Windows, and the like. In general, computing system 110 may utilize monitoring module 150 to monitor the health of any switches 170 accessible by computing system 110. Monitoring module 150 may be any network management tool compatible with computing system 110, such as, for example, Nagios. In some embodiments, monitoring module 150 may use SNMP to monitor switches 170. For example, monitoring module may invoke SNMP Get Requests by using check_snmp module 160, which may be a plugin that performs the actual "snmpget" commands on behalf monitoring module 150.

In network system 100, a configuration file 130 may be created for each switch 170 to be monitored. In particular, monitoring module 150 may process a configuration file 130 associated with a switch 170. Upon processing, monitoring module 150 may be configured to monitor and manage the switch 170 associated with the configuration file 130 which was processed. As illustrated in FIG. 1, monitoring module 150 may use hardware within computing system 110 to process configuration files 130 and perform monitoring.

A configuration file 130 associated with a switch 170 may include descriptions of the components of a switch 170 to be monitored and their associated OIDs. For example, a configuration file 130 may include a host parameter specifying a host to be monitored, i.e., the switch, and service descriptions specifying objects to be monitored by monitoring module 150. In other words, the host parameter may define the switch 170 for monitoring module 150 to monitor and a service description may be defined for each object of switch 170 to be monitored. Another parameter, such as, for example, a check_command parameter, may be used to define parameters to be utilized by check_snmp module 160 to read information from a switch 170, such as an OID of a component to monitor. In some embodiments, monitoring module 150 may execute periodic SNMP Get Requests based on the service descriptions in the switch configuration file 130.

According to some embodiments, computing system 110 may perform operations specified in switch monitor configuration module 140 to initiate the configuring of network management tool 150 to manage and monitor a switch 170. In particular, to initiate the configuring, computing system 110 may receive an IP address associated with a switch 170, such as, for example, switch 170A. According to one embodiment, the IP address may be received by computing system 110 as input provided by a user of computing system 110, such as a network administrator. In some embodiments, a user may also provide a unique name to identify the switch 170A to be monitored, such as "Switch 1."

Based on the IP address provided for switch 170A, computing system 110, executing instructions in accordance with switch monitor configuration module 140, may probe switch 170A to obtain information regarding switch 170A, such as the vendor of switch 170A, the model of switch 170A, and the firmware version of switch 170A. The probing of switch 170A in accordance with operations specified by switch monitor configuration module 140 to obtain the information may include issuing multiple requests and receiving various information based on the different requests. For example, probing may include transmitting a first request to switch 170A requesting information from switch 170A available in a standard MIB in switch 170A. In particular, transmitting the first request may include computing system 110 sending a SNMP Get Request via check_snmp module 160 on a standard MIB OID to switch 170A. In response to receipt of the request, switch 170A may transmit, and computing system 110 may receive, a portion of the information about switch 170A necessary to complete the configuration of monitoring module 150 to monitor switch 170A, such as the vendor of switch 170A and the model of switch 170A.

Based on the received vendor and model information about switch 170A, computing system 110 may prepare a second request to be transmitted to switch 170A to obtain the remainder of the information about switch 170A necessary to complete the configuration of monitoring module 150 to monitor switch 170A, such as the firmware level/version installed on switch 170A. For example, because the firmware levels/versions may be unique to switch 170A, the second request may be a request for information in a switch-specific MIB. In some embodiments, the second request to access information in the switch-specific MIB may be made only upon receipt of the vendor and model information because that information may be needed to access the switch-specific MIB. Thus, once the information needed to make a request for information in a switch-specific MIB is known, computing system 110 may transmit the second request to switch 170A requesting information from switch 170A available in a switch-specific MIB associated with switch 170A. In particular, transmitting the second request may include computing system 110 sending another SNMP Get Request via check_snmp module 160 on a switch-specific MIB OID to switch 170A. In response to receipt of the second request, switch 170A may transmit, and computing system 110 may receive, the remainder of the information about switch 170A necessary to complete the configuration of monitoring module 150 to monitor switch 170A, such as the firmware version/level installed on switch 170A.

In some embodiments, the vendor, model, and firmware version information about switch 170A may be sufficient to configure monitoring module 150 to monitor switch 170A. Thus, upon receipt of the information, computing system 110 may configure network management tool 150 to monitor switch 170A based on processing of at least the vendor, model, and firmware version information of switch 170A. According to one embodiment, because monitoring module 150 may utilize the hardware of computing system 110 to perform the monitoring of switch 170A, configuring may include configuring computing system 110 to monitor switch 170A based on processing of the first information. For example, computing system 110 may be configured to monitor switch 170A upon execution of instructions provided by monitoring module 150 based on at least the vendor, model, and firmware version/level information about switch 170A.

According to an embodiment of the disclosure, configuring may include selecting, based at least in part on the information received from switch 170A, a template file to use to create a switch configuration file 130A for configuring computing system 110 to monitor switch 170A. For example, computing system 110, operating in accordance with instructions provided by switch configuration module 140, may access template database 120 to identify and select a template configuration file to use to create the switch configuration file 130A for switch 170A. In some embodiments, template database 120 may be a database that includes a plurality of template configuration files which can be used to create switch-specific configuration files for switches 170 upon knowledge of the vendor, model, and firmware version/level associated with a switch 170. Thus, after selecting a template file, computing system may create the switch configuration file 130A that is specific for switch 170A based, at least in part, on the selected template file. For example, a selected template file may include fields in which the switch-specific information may be substituted for the template place holder information already in the field to create the switch-specific switch configuration file 130A for switch 170A.

With the switch-specific switch configuration file 130A created, computing system 110 may configure network management tool 150 to monitor switch 170A based on processing of the created switch-specific switch configuration file 130A. As noted above, because monitoring module 150 may utilize the hardware of computing system 110 to perform the monitoring of switch 170A, configuring may include configuring computing system 110 to monitor switch 170A based on processing of the switch-specific switch configuration file 130A in accordance with instructions provided by monitoring module 150. For example, computing system 110 may be configured to monitor switch 170A upon execution of instructions provided by monitoring module 150 based on processing of switch-specific switch configuration file 130A.

As shown, the configuring of computing system 110 to monitor a switch 170 may be performed with none of the switch information, such as vendor, model, and firmware version/level information, being provided by a network administrator. The network administrator may simply provide the IP address of a switch 170, and as disclosed herein, the remainder of the information need for configuring computing system 110 to monitor switch 170 may be obtained by computing system 110.

In some embodiments, computing system 110 may also be configured to remove a switch from monitoring. For example, instructions provided by switch configuration module 140 may cause computing system 110 to remove a switch 170 based on solely the name of the switch 170, for example, a name which may have been previously provided by a user of computing system 110.

Figure 2:
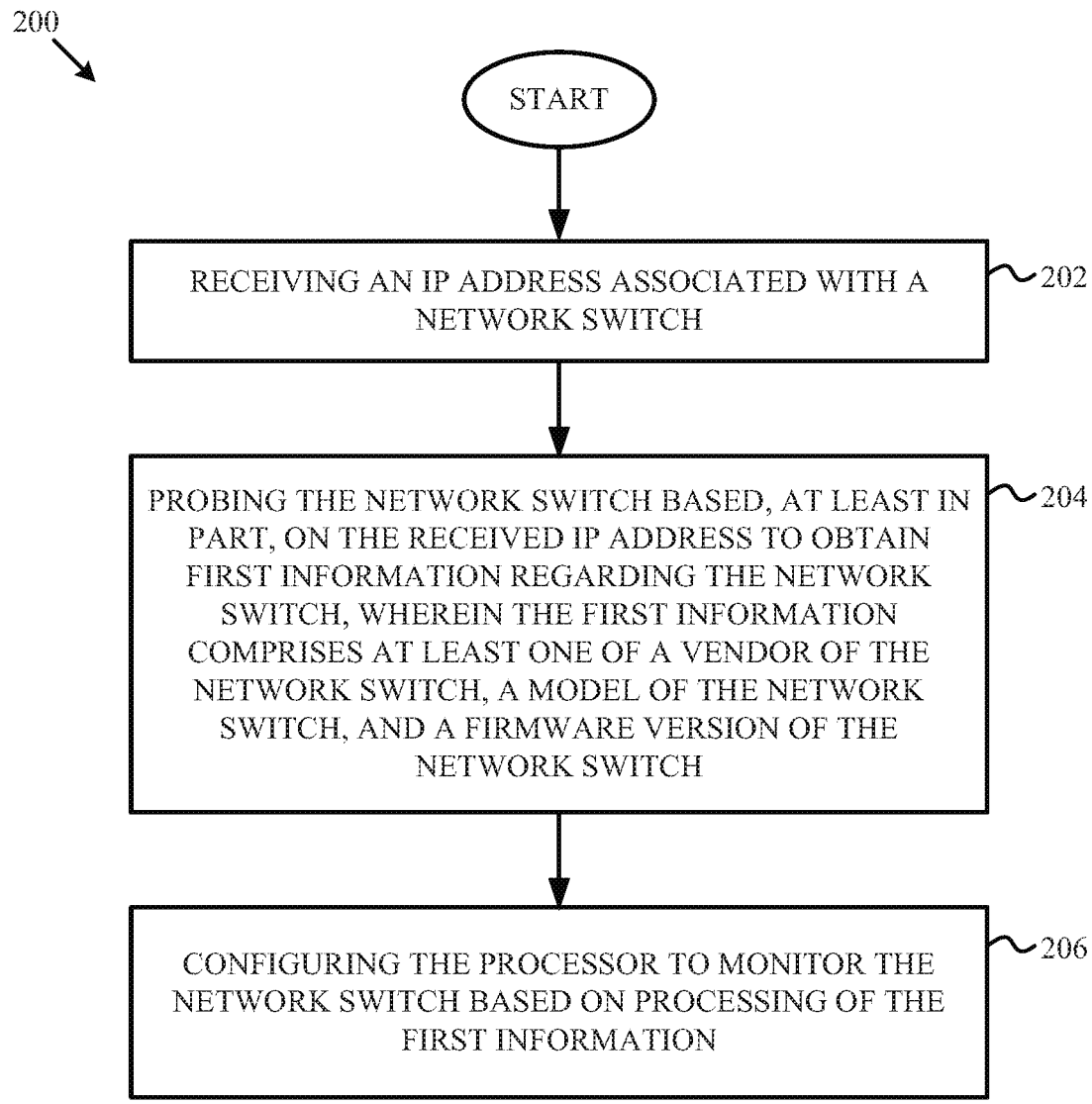
FIG. 2 provides a flow chart illustrating a method for dynamically configuring a network switch for monitoring according to one embodiment of the disclosure.

FIG. 2 provides a flow chart illustrating a method for dynamically configuring a network switch for monitoring according to one embodiment of the disclosure. It is noted that embodiments of method 200 may be implemented in accordance with the systems and embodiments described herein with respect to FIGS. 1 and 3-4. For example, embodiments of method 200 may be implemented by the computing systems illustrated in FIGS. 1 and 3-4, such as a computing system 110 of FIG. 1, server 302 of FIG. 3, or computer system 400 of FIG. 4. In general, embodiments of method 200 may be implemented by other similar systems without deviating from this disclosure so long as the systems, whether directly or indirectly, support the operations as described herein.

Specifically, method 200 includes, at block 202, receiving, by a processor, an IP address associated with a network switch. At block 204, method 200 includes probing, by the processor, the network switch based, at least in part, on the received IP address to obtain first information regarding the network switch, wherein the first information includes at least one of a vendor of the network switch, a model of the network switch, and a firmware version of the network switch. In some embodiments, probing may include transmitting a first request to the network switch requesting information from the network switch available in a standard MIB associated with the network switch. According to one embodiment, the first request may be prepared and the network switch may be identified based, at least in part, on the received IP address. Probing may also include receiving from the network switch a portion of the first information, wherein the portion of the first information includes at least the vendor of the network switch and the model of the network switch.

In some embodiments, probing may also include preparing a second request to be transmitted to the network based, at least in part, on the received portion of the first information and transmitting the second request to the network switch requesting information from the network switch available in a switch-specific MIB associated with the network switch. In response, a computing system may receive from the network switch an additional portion of the first information, wherein the additional portion of the first information includes the firmware version of the network switch. Thus, in some embodiments, none of the first information may be obtained from a network administrator. Instead, a network administrator need only provide an IP address of a switch.

At block 206, method 200 includes configuring, by the processor, the processor to monitor the network switch based on processing of the first information. In particular, according to an embodiment, configuring may be based on the received portion and additional portion of the first information. In some embodiments, configuring may include selecting, based at least in part on the first information, a template file to use to create a configuration file for configuring the processor to monitor the network switch. Based, at least in part, on the selected template file, the configuration file that is specific for the network switch may be created. With the configuration file created, a computing system implementing method 200 may execute the configuration file, wherein execution of the configuration file configures the processor to monitor the network switch. Upon processing of the configuration file, such as by its execution, a computing system may be configured to monitor the network switch.

The schematic flow chart diagram of FIG. 2 is generally set forth as a logical flow chart diagram. As such, the depicted order and labeled steps are indicative of one embodiment of the disclosed method. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by various aspects of the systems disclosed herein. Other steps and methods may be conceived that are equivalent in function, logic, or effect to one or more steps, or portions thereof, of the illustrated methods. Additionally, the format and symbols employed are provided to explain the logical steps of the methods and are understood not to limit the scope of the methods. Although various arrow types and line types may be employed in the flow chart diagrams, they are understood not to limit the scope of the corresponding methods. Indeed, some arrows or other connectors may be used to indicate only the logical flow of the methods. For instance, an arrow may indicate a waiting or monitoring period of unspecified duration between enumerated steps of the depicted methods. Additionally, the order in which a particular method occurs may or may not strictly adhere to the order of the corresponding steps shown.

Figure 3:
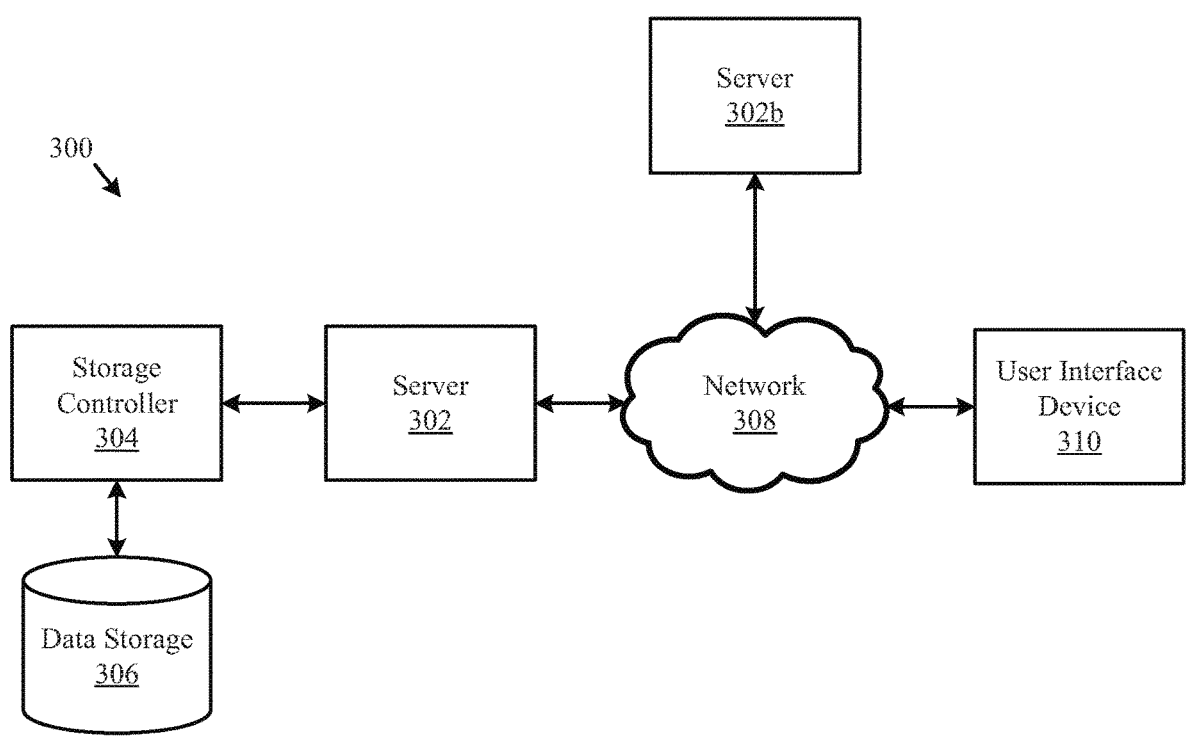
FIG. 3 is a block diagram illustrating a computer network according to one embodiment of the disclosure.

FIG. 3 illustrates one embodiment of a system 300 for dynamically configuring a network switch for monitoring according to one embodiment of the disclosure. The system 300 may include a server 302, a data storage device 306, a network 308, and a user interface device 310. The server 302 may also be a hypervisor-based system executing one or more guest partitions hosting operating systems with modules having server configuration information. In a further embodiment, the system 300 may include a storage controller 304, or a storage server configured to manage data communications between the data storage device 306 and the server 302 or other components in communication with the network 308. In an alternative embodiment, the storage controller 304 may be coupled to the network 308.

In one embodiment, the user interface device 310 is referred to broadly and is intended to encompass a suitable processor-based device such as a desktop computer, a laptop computer, a personal digital assistant (PDA) or tablet computer, a smartphone or other mobile communication device having access to the network 308. In a further embodiment, the user interface device 310 may access the Internet or other wide area or local area network to access a web application or web service hosted by the server 302 and may provide a user interface for enabling a user to enter or receive information.

The network 308 may facilitate communications of data between the server 302 and the user interface device 310. In some embodiments, the network 302 may also facilitate communication of data between the server 302 and other servers/processors, such as server 302b. For example, the network 308 may include a switched fabric computer network communications link to facilitate communication between servers/processors, also referred to as data storage nodes. In some embodiments, the servers 302 and 302b may represent nodes or clusters of nodes managed by a software framework. The network 308 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 4:
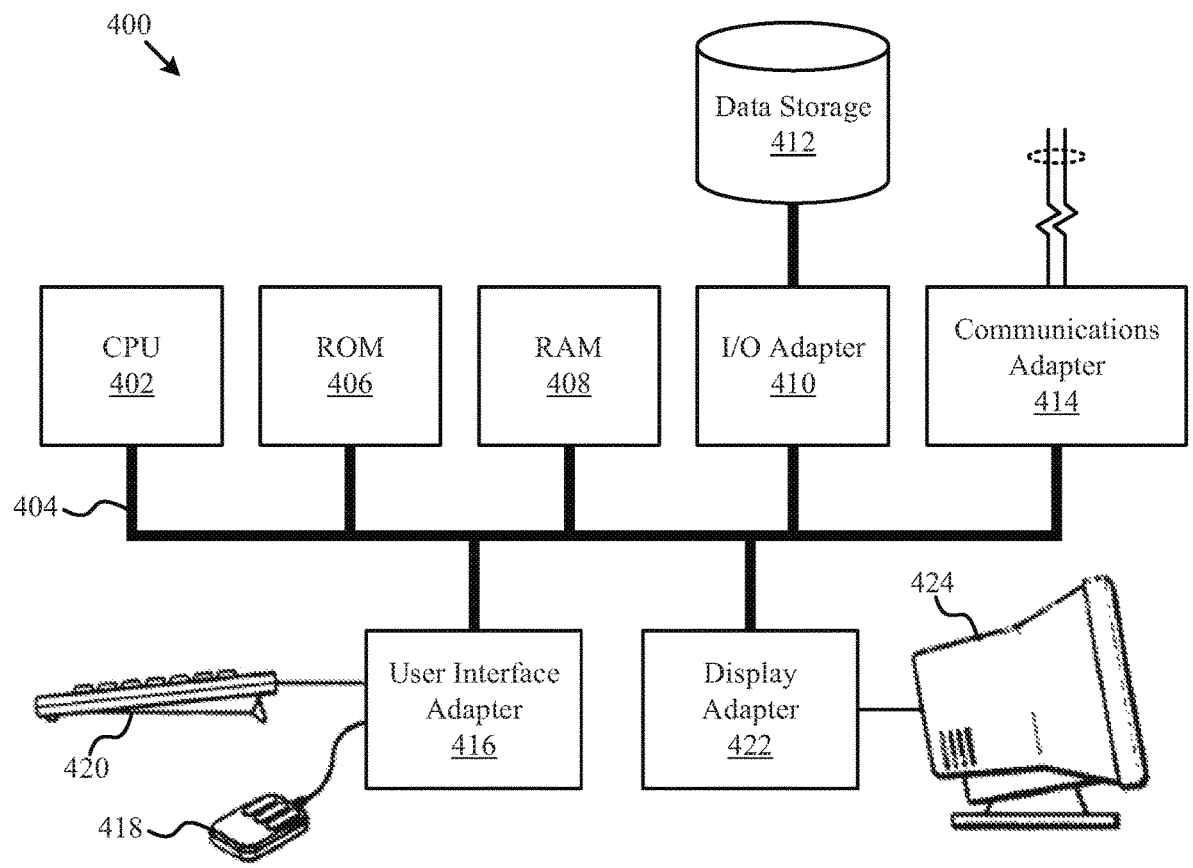
FIG. 4 is a block diagram illustrating a computer system according to one embodiment of the disclosure.

FIG. 4 illustrates a computer system 400 adapted according to certain embodiments of a server and/or a user interface device. The central processing unit ("CPU") 402 is coupled to the system bus 404. The CPU 402 may be a general purpose CPU or microprocessor, graphics processing unit ("GPU"), and/or microcontroller. The present embodiments are not restricted by the architecture of the CPU 402 so long as the CPU 402, whether directly or indirectly, supports the operations as described herein. The CPU 402 may execute the various logical instructions according to the present embodiments.

The computer system 400 may also include random access memory (RAM) 408, which may be synchronous RAM (SRAM), dynamic RAM (DRAM), synchronous dynamic RAM (SDRAM), or the like. The computer system 400 may utilize RAM 408 to store the various data structures used by a software application. The computer system 400 may also include read only memory (ROM) 406 which may be PROM, EPROM, EEPROM, optical storage, or the like. The ROM may store configuration information for booting the computer system 400. The RAM 408 and the ROM 406 hold user and system data, and both the RAM 408 and the ROM 406 may be randomly accessed.

The computer system 400 may also include an input/output (I/O) adapter 410, a communications adapter 414, a user interface adapter 416, and a display adapter 422. The I/O adapter 410 and/or the user interface adapter 416 may, in certain embodiments, enable a user to interact with the computer system 400. In a further embodiment, the display adapter 422 may display a graphical user interface (GUI) associated with a software or web-based application on a display device 424, such as a monitor or touch screen.

The I/O adapter 410 may couple one or more storage devices 412, such as one or more of a hard drive, a solid state storage device, a flash drive, a compact disc (CD) drive, a floppy disk drive, and a tape drive, to the computer system 400. According to one embodiment, the data storage 412 may be a separate server coupled to the computer system 400 through a network connection to the I/O adapter 410. The communications adapter 414 may be adapted to couple the computer system 400 to a network, which may be one or more of a LAN, WAN, and/or the Internet. The user interface adapter 416 couples user input devices, such as a keyboard 420, a pointing device 418, and/or a touch screen (not shown) to the computer system 400. The display adapter 422 may be driven by the CPU 402 to control the display on the display device 424. Any of the devices 402-422 may be physical and/or logical.

The applications of the present disclosure are not limited to the architecture of computer system 400. Rather the computer system 400 is provided as an example of one type of computing device that may be adapted to perform the functions of a server and/or the user interface device 410. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, in some embodiments, aspects of the computer system 400 may be virtualized for access by multiple users and/or applications.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data may be configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for dynamically configuring switch monitoring, the method comprising:
    receiving, by a processor, an Internet Protocol (IP) address associated with a network switch;
    probing, by the processor, the network switch based, at least in part, on the received IP address to obtain first information regarding a vendor of the network switch and a model of the network switch;

preparing a request, to be transmitted to the network switch, for second information regarding a firmware version of the network switch based, at least in part, on the first information;
receiving from the network switch the second information comprising the firmware version of the network switch, in response to the request;
configuring, by the processor, the processor to monitor the network switch based on the processing of first information and on processing of the second information;
selecting, based at least in part on the first information and/or the second information, a template file to use to create a configuration file for configuring the processor to monitor the network switch;
creating the configuration file that is specific for the network switch based, at least in part, on the selected template file; and
executing the configuration file, wherein execution of the configuration file configures the processor to monitor the network switch.

2. The method of claim 1, wherein probing comprises:
transmitting a first request to the network switch requesting information from the network switch available in a standard management information base (MIB) associated with the network switch, wherein the first request is prepared and the network switch is identified based, at least in part, on the received IP address; and
receiving from the network switch the first information.

3. The method of claim 2, wherein probing further comprises:
transmitting a second request to the network switch requesting information from the network switch available in a switch-specific management information base (MIB) associated with the network switch.

4. The method of claim 3, wherein none of the first information and none of the second information are obtained from a network administrator.

5. The method of claim 1, further comprising monitoring the network switch based on the processing of the first information and/or the processing of the second information.

6. A computer program product, comprising:
a non-transitory computer readable medium comprising instructions which, when executed by a processor of a computer system, cause the processor to perform the steps of:
receiving an Internet Protocol (IP) address associated with a network switch;
probing the network switch based, at least in part, on the received IP address to obtain first information regarding the network switch, wherein the first information comprises a vendor of the network switch and a model of the network switch;
preparing a request for second information regarding a firmware version of the network switch to be transmitted to the network switch based, at least in part, on the first information;
receiving from the network switch the second information comprising the firmware version of the network switch, in response to the request;
configuring, by the processor, the processor to monitor the network switch based on processing of the first information and on processing of the second information;
selecting, based at least in part on the first information and/or the second information, a template file to use to create a configuration file for configuring the processor to monitor the network switch;
creating the configuration file that is specific for the network switch based, at least in part, on the selected template file; and
executing the configuration file, wherein execution of the configuration file configures the processor to monitor the network switch.

7. The computer program product of claim 6, wherein the medium further comprises instructions which cause the processor to perform the steps of:
transmitting a first request to the network switch requesting information from the network switch available in a standard management information base (MIB) associated with the network switch, wherein the first request is prepared and the network switch is identified based, at least in part, on the received IP address; and
receiving from the network switch the first information.

8. The computer program product of claim 7, wherein the medium further comprises instructions which cause the processor to perform the steps of:
transmitting a second request to the network switch requesting information from the network switch available in a switch-specific management information base (MIB) associated with the network switch.

9. The computer program product of claim 8, wherein none of the first information and none of the second information are obtained from a network administrator.

10. The computer program product of claim 6, wherein the medium further comprises instructions which cause the processor to perform the step of monitoring the network switch based on the processing of the first information and/or the processing of the second information.

11. An apparatus, comprising:
a memory; and
a processor coupled to the memory, wherein the processor is configured to perform the steps of:
receiving an Internet Protocol (IP) address associated with a network switch;
probing the network switch based, at least in part, on the received IP address to obtain first information regarding the network switch, wherein the first information comprises a vendor of the network switch and a model of the network switch;
preparing a request for second information regarding a firmware version of the network switch to be transmitted to the network switch based, at least in part, on the first information;
receiving from the network switch the second information comprising the firmware version of the network switch, in response to the request;
configuring, by the processor, the processor to monitor the network switch based on processing of the first information and on processing of the second information;
selecting, based at least in part on the first information and/or the second information, a template file to use to create a configuration file for configuring the processor to monitor the network switch;
creating the configuration file that is specific for the network switch based, at least in part, on the selected template file; and
executing the configuration file, wherein execution of the configuration file configures the processor to monitor the network switch.

12. The apparatus of claim 11, wherein the processor is further configured to perform the steps of:
transmitting a first request to the network switch requesting information from the network switch available in a standard management information base (MIB) associated with the network switch, wherein the first request is prepared and the network switch is identified based, at least in part, on the received IP address; and receiving from the network switch the first information.

13. The apparatus of claim 12, wherein the processor is further configured to perform the steps of:

transmitting a second request to the network switch requesting information from the network switch available in a switch-specific management information base (MIB) associated with the network switch.

14. The apparatus of claim 13, wherein none of the first information and none of the second information are obtained from a network administrator.

15. The apparatus of claim 11, wherein the processor is further configured to perform the step of monitoring the network switch based on the processing of the first information and/or the processing of the second information.

* * * * *